United States Patent [19]

Hundley, III

[11] Patent Number: 4,565,015

[45] Date of Patent: Jan. 21, 1986

[54] CENTRIFUGAL PELLET DRYER

[75] Inventor: Raymond E. Hundley, III, Eagle Rock, Va.

[73] Assignee: Gala Industries, Inc., Eagle Rock, Va.

[21] Appl. No.: 517,679

[22] Filed: Jul. 27, 1983

[51] Int. Cl.⁴ .............................................. F26B 11/12
[52] U.S. Cl. .......................................... 34/182; 34/58; 34/175
[58] Field of Search ................... 34/8, 33, 58, 69, 182, 34/175

[56] References Cited

U.S. PATENT DOCUMENTS

| | | | |
|---|---|---|---|
| 1,220,131 | 3/1917 | Jenkins | 34/175 |
| 3,330,050 | 7/1967 | Ausherman | 34/182 |
| 3,581,407 | 6/1971 | Ward et al. | 34/182 |
| 4,126,947 | 11/1978 | Labouygues | 34/69 |
| 4,130,944 | 12/1978 | Hultsch et al. | 34/58 |
| 4,432,148 | 2/1984 | Darbonne et al. | 34/58 |

Primary Examiner—Albert J. Makay
Assistant Examiner—Steven E. Warner
Attorney, Agent, or Firm—Harvey B. Jacobson

[57] ABSTRACT

A centrifugal pellet dryer including an exhaust fan mounted on the upper end of the dryer in direct communication with the interior of the dryer for removing moisture laden air therefrom. The exhaust fan impeller is connected directly to the upper end of the rotor shaft so that a single motor drives the rotor and exhaust fan. A unique rotor with a larger length to diameter ratio is included in the dryer for increased pellet drying efficiency.

6 Claims, 5 Drawing Figures

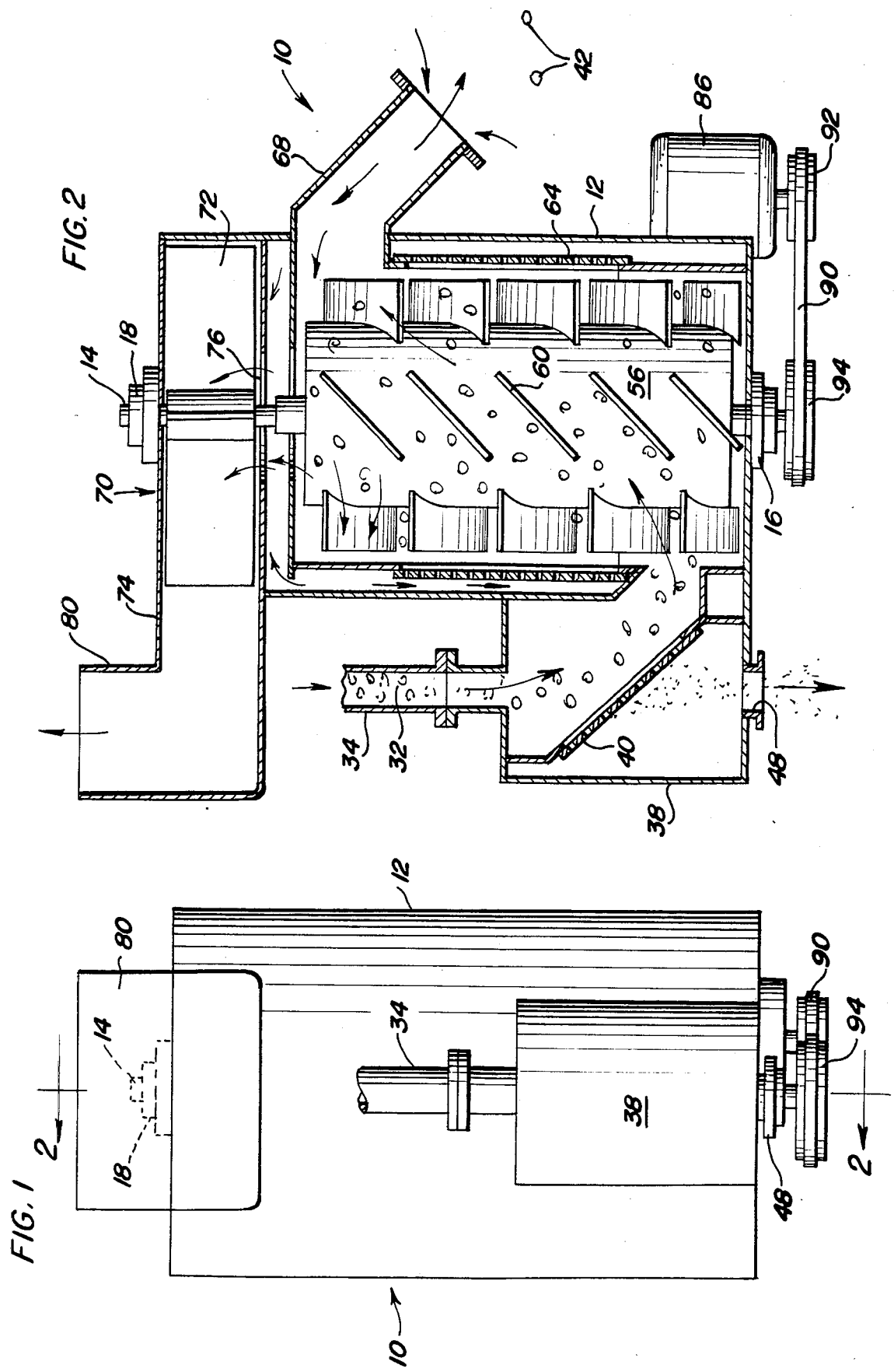

CENTRIFUGAL PELLET DRYER

BACKGROUND OF THE INVENTION

1. Field of the Invention

The present invention relates to a centrifugal pellet dryer having an exhaust fan associated therewith for removing moist air and more particularly to such an arrangement in which the exhaust fan is mounted directly on top of the dryer housing and in direct communication therewith with the fan impeller being connected directly to the dryer rotor shaft. The dryer also includes a unique rotor structure that is quite rigid due to its welded construction and its main structure being square tubing.

2. Description of the Prior Art

Conventional centrifugal pellet dryers use a bladed rotor to sling wet pellets against a peripheral screen which retains the pellets while surface moisture passes through the screen. The blade structure of the rotor is slanted for moving the pellets upwardly as they are slung against the screen with the pellets being discharged through a discharge chute which communicates with the upper end of the screen. The rotor also acts as a fan and blows moist air out of the pellet discharge chute with the moist air hindering the drying process particularly when the relative humidity in the dryer is high. This type of dryer is disclosed in U.S. Pat. No. 3,458,045, issued July 29, 1969 to Vernon E. Dudley. As an improvement to the above described dryer, a blower has been communicated with the periphery of the dryer adjacent the upper end thereof to exhaust moist air. This arrangement reduces moisture carry-over characteristics but it is expensive, requires much more floor space, supporting structure, duct work and maintenance.

Other dryers relating to the present invention are shown in the following U.S. patents:

U.S. Pat. No. 2,274,948, N. Ahlmann
U.S. Pat. No. 2,688,807, J. H. Ginther
U.S. Pat. No. 2,869,249, H. Kemp
U.S. Pat. No. 3,199,215, D. R. Jesse et al
U.S. Pat. No. 3,724,091, J. A. N. Rousselet
U.S. Pat. No. 4,126,947, J. Labouygues These patents disclose dryers utilizing blowers to circulate air therethrough. The Jesse et al patent discloses an arrangement in which the blower is located laterally at the bottom of the shell and the Kemp patent discloses an air circulating device for a dryer. The Ginther patent discloses an exhaust fan associated with a dryer.

SUMMARY OF THE INVENTION

An object of the present invention is to provide a centrifugal pellet dryer having an exhaust fan provided at the upper end which communicates directly with the interior of the dryer with the dryer rotor shaft extending upwardly from the dryer and being connected to the fan impeller so that the fan and rotor are driven from the same motor.

Another object of the present invention is to provide a centrifugal pellet dryer incorporating a unique rotor therein having a higher length to diameter ratio in order to significantly increase the drying efficiency while reducing the cost of the rotor.

A further object of the invention is to provide a centrifugal pellet dryer in accordance with the preceding objects which produces a countercurrent flow of air through the pellet discharge chute which enables a smaller volume of air flow to effectively dry the pellets.

Yet another object of the invention is to provide a centrifugal pellet dryer in accordance with the preceding objects in which the exhaust fan does not require any additional floor space, no interconnecting duct work, no additional supporting structure and eliminates the usually provided air inlet thereby reducing overall cost. Also, the rotor is more rigid as it is of welded construction, easier to balance, easier to clean, easier to install, less expensive to manufacture and capable of drying more pellets per hour of operation, thereby reducing operating cost.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is an elevational view of a centrifugal pellet dryer according to the present invention.

FIG. 2 is a sectional view taken along section line 2—2 of FIG. 1.

DESCRIPTION OF THE PREFERRED EMBODIMENTS

Figure 3:
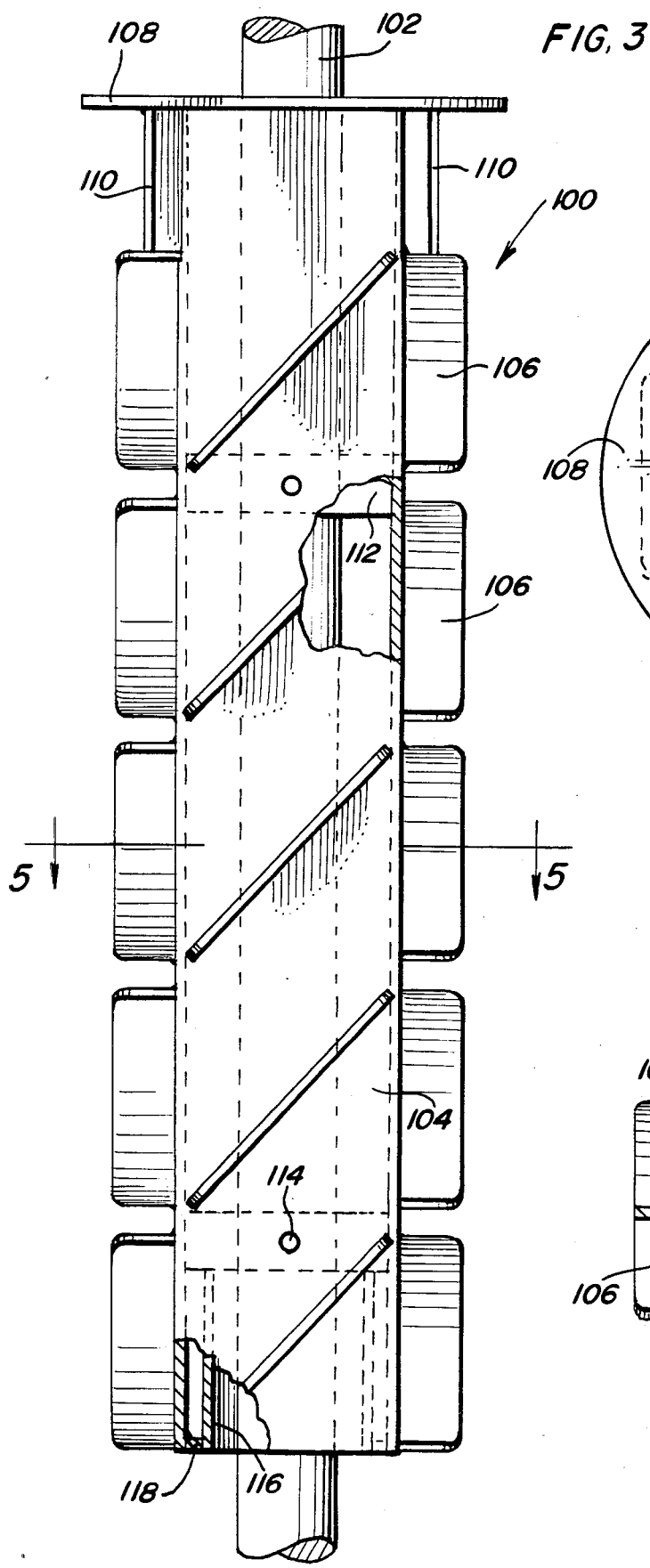
FIG. 3 is a side elevational view, on an enlarged scale, of another embodiment of the rotor with portions in section.

Referring now to the drawings, FIGS. 1 and 2 illustrate a centrifugal pellet dryer 10 which includes a vertical housing 12 of generally cylindrical configuration supported in any suitable manner. A slurry 32 of pellets and water enters the dryer through a slurry inlet 34 and impinge against a water separator 38 in the form of an inclined screen 40 which deflects the pellets 42 with most of the water passing through the screen and out through outlet 48 in a conventional and well known manner.

The housing 12 has a rotor 56 of cylindrical, hollow construction supported by web or strut elements (not shown) from a vertical shaft 14 journalled by bearings 16 and 18. Angularly attached to the rotor 56 in circumferential and longitudinal spaced relation is a series of slanted deflection plates or blades 60. The free end of the blades 60 are contoured to be spaced from an adjacent screen sheet or screen enclosure 64 extending peripherally of the rotor in spaced relation thereto. The direction of rotation of the rotor 56 together with the slanted blades 60 impinges the pellet slurry 32 against screen 64 for separating water from the slurry and to drive or carry the pellets separated from the water upwardly toward the top of the screen 64 for discharge through a resin discharge chute 68. The chute 68 receives the discharge pellets passing radially outwardly from the rotor 56 and the chute 68 contains an angle section or bend that deflects and conducts the resin pellets 42 downwardly to a discharge point. If desired, the discharge chute 68 may have a conduit extending back into the bottom of the housing with a diverter valve selectively diverting the pellets back into the housing for recirculation for additional drying if desired. The diverter valve may be a simple pivotal plate for permitting the resin pellets to be discharged from the chute 68 or diverted back into the lower end of the housing for recirculation.

A counterflow or countercurrent of air is drawn into the chute 68 in contact with the pellets 42 exiting therefrom to further dry the pellets. Ambient air enters the chute 68 for counterflow of air with respect to the pellets with the air movement being induced by a fan 70 having an air impeller 72 mounted in a housing 74. The fan impeller 72 is mounted on the upper end of shaft 14 which extends up through housing 74 which has a large inlet opening 76 concentric with shaft 14. The housing 74 is rigid with the upper end of the dryer housing 12 and is in communication with the interior thereof for exhausting moist air through outlet 80. By mounting the fan 70 on top of the housing 12 no additional floor space is required for the fan and interconnecting duct work and supporting structure are minimized. By drawing air into the chute 68, fan 70 will more effectively dry the pellets 42 by the counterflow of the air in relation to the exiting pellets.

The fan is driven by a suitable electric motor 86 mounted from the housing or in any other suitable manner adjacent thereto with the motor driving the shaft 14 through belt 90 and pulleys 92 and 94. The motor 86 drives both the the rotor 56 and the impellar 72 of the blower fan 70 from its common shaft 14 thereby eliminating the necessity of providing a separate exhaust blower and motor as heretofore used.

Figure 4:
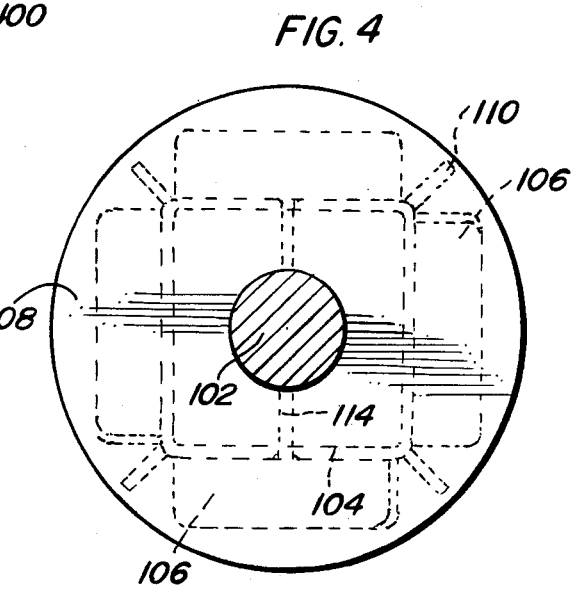
FIG. 4 is a top plan view of the rotor of FIG. 3.
Figure 5:
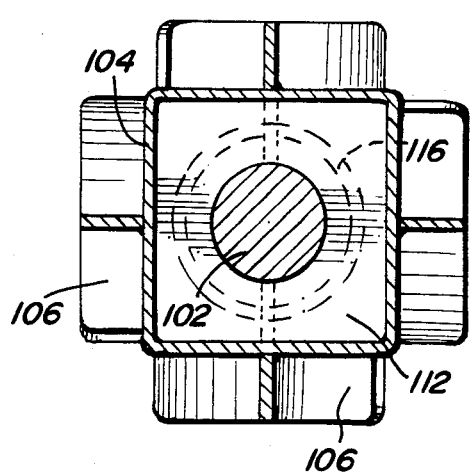
FIG. 5 is a sectional view along section line 5—5 of FIG. 3.

FIGS. 3-5 illustrate a rotor 100 mounted on a shaft 102 which may be the same as shaft 14 in FIGS. 1 and 2 and which is vertically supported and related to the housing, screen fan and drive assembly in the same manner as shown in FIGS. 1 and 2.

The rotor 100 includes a length of square tubing 104 provided with a plurality of vertically spaced inclined blades 106 on the exterior of each sidewall to move the slurry toward the screen and move the pellets upwardly for discharge from the discharge chute in generally the same manner as the rotor 56 in FIGS. 1 and 2. The upper end of the rotor 100 includes a circular top plate 108 having a periphery disposed slightly outwardly of the outer extremities of the blades 106. Each corner of the square tubing 104 includes radial blade 110 which extends downwardly to a point generally aligned with the upper edge of the uppermost blades 106 for providing radial movement to pellets and rigidify the rotor. The square tubing 104 is rigidly supported from shaft 102 by a pair of vertically spaced plate supports 112 and pins 114 which may extend transversely of the tubing 104. A reinforcing tube 116 extends to lower plate support 112 and the lower end of the square tubing may be closed by the use of welded plates 118 with all of the rotor components being welded together and welded to the shaft.

The rotor 100 is of welded construction and, since it has a reduced diameter, eliminates balancing problems associated with existing rotor assemblies, including those of bolted construction and is more rigid than existing rotors because it is a weldment of smaller diameter and its main structure is square tubing. Further, the vertical square tubing 104 providing support for the slanted blades 106 is easier to clean and maintain and its fewer parts reduces the cost of construction and reduces the assembly procedure because it is basically a weldment.

The rotor 100 has a length to diameter (L/D) ratio of 23⅜ inches to 7⅜ inches or about 3.2 and in operation, the rotor 100 has successfully dried pellets at rates of about 1500 pounds per hour as compared with existing rotors having a length of 21½ inches and a diameter of 15 inches or L/D of about 1.4 which is capable of drying plastic pellets at the rate of 1000 pounds per hour. Thus, the increase in L/D significantly increases drying efficiency and also reduces material cost and assembly cost.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a centrifugal pellet dryer of the type comprising a housing with a slurry inlet, a water discharge adjacent the bottom thereof for discharging most of the water from the slurry, a pellet discharge adjacent the top thereof, a peripheral screen interiorly of the housing in spaced relation thereto, a rotor with inclined blades positioned within the screen for conveying pellets upwardly and centrifugally discharging the pellets against the screen for further separation of water therefrom for discharge from the bottom of the housing and for discharge of pellets from the pellet discharge adjacent the top of the housing, means driving the rotor, that improvement comprising a fan supported above the housing and having an intake communicated with the top portion of the interior thereof, said fan including an air discharge for inducing countercurrent airflow into the pellet discharge at the upper end of the housing for more efficiently drying pellets as they exit from the housing, said pellet discharge comprising a downwardly inclined chute with an open lower end to admit air, said fan including an impeller disposed in a fan casing, said rotor being supported by a shaft having an upper end extending into the fan casing with the impeller being mounted on the shaft for rotation therewith, a single motor drivingly connected to said shaft for driving said rotor and impeller, said slurry inlet including means separating the pellets and water and discharging water to the water discharge and discharging wet pellets into the interior of the screen adjacent the bottom thereof, said screen having an outlet adjacent the top thereof in communication with the pellet discharge chute, said housing having an opening in the top portion thereof communicating with the fan casing for enabling air to flow inwardly through the chute into the housing and into the fan casing with the dry air entering the chute coming into contact with the pellets to remove additional moisture therefrom.

2. In a centrifugal pellet dryer of the type comprising a housing with a slurry inlet, a water discharge adjacent the bottom thereof, a pellet discharge adjacent the top thereof, a peripheral screen interiorly of the housing in spaced relation thereto, a rotor with inclined blades positioned within the screen for conveying pellets upwardly and centrifugally discharging the slurry against the screen for separation of water therefrom for discharge from the bottom of the housing and for discharge of pellets from the pellet discharge adjacent the top of the housing, means driving the rotor, that improvement comprising a fan supported above the housing and having an intake communicated with the interior thereof, said fan including an air discharge for inducing countercurrent airflow into the pellet discharge at the upper end of the housing for more efficiently drying pellets as they exit from the housing, said rotor including a hollow square tubing extending vertically in the dryer housing with each sidewall of the hollow tubing including a plurality of outwardly extending, spaced, inclined blades having outer edges oriented in closely spaced relation to the screen, the slurry inlet being communicated with the bottom of the dryer housing and provided with an inclined screen to deflect pellets into the housing and permit vertical passage of water therethrough to the water discharge, said pellet discharge including a chute extending laterally from the upper end portion of the screen for discharge of pellets from the interior of the screen with the counter current inflow of air into the chute causing contact between the relatively dry air and the relatively moist pellets for more efficient drying of the pellets due to the moisture gradient between the pellets and incoming air, said fan including a rotatable impeller rigidly connected with the rotor for rotation therewith, a single motor driving the rotor and fan impeller for discharging moist air with the discharge from the fan being disposed generally above the slurry inlet, said motor being located adjacent the bottom of the dryer housing in opposed relation to the slurry inlet and generally below and in alignment with the pellet discharge chute and air inlet formed by the chute to provide a compact dryer structure for occupying minimal floor space and utilizing a minimum of components.

3. The structure as defined in claim 2 wherein the length to diameter ratio of the rotor is between 3 and 4.

4. The structure as defined in claim 3 wherein the length to diameter ratio of the rotor is 3.2.

5. The structure as defined in claim 2 wherein said square tubing includes a circular plate forming a closure for the upper end thereof, and radially extending plates on the upper end portion of the square tubing and fixed to the underside of the circular plate and extending to a point in alignment with the leading edges of the uppermost blades for rigidifying the rotor and imparting radial movement to the pellets.

6. The structure as defined in claim 5 wherein said rotor has a length to diameter ratio of approximately 3.2 to enable increased flow of pellets through the dryer as compared to rotors having a length to diameter ratio substantially less than 3.2.

* * * * *